United States Patent
Goel et al.

(10) Patent No.: US 11,379,858 B2
(45) Date of Patent: Jul. 5, 2022

(54) USER APPARATUS AND MANAGER APPARATUS INCLUDED IN BLOCKCHAIN NETWORK AND CONTROLLING METHOD THEREOF

(71) Applicant: Samsung Electronics Co., Ltd., Suwon-si (KR)

(72) Inventors: Umang Goel, Karnataka (IN); Rahul Rajendra Sonanis, Karnataka (IN); Siddharth Lal, Karnataka (IN); Ishan Rastogi, Karnataka (IN); Yeon Hyang Kim, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/144,707

(22) Filed: Jan. 8, 2021

(65) Prior Publication Data

US 2021/0224827 A1  Jul. 22, 2021

(30) Foreign Application Priority Data

Jan. 17, 2020 (IN) .............................. 202041002191
Jul. 30, 2020 (IN) ............................ 2020 41002191
Oct. 21, 2020 (KR) ........................ 10-2020-0137113

(51) Int. Cl.
  *G06Q 30/02*  (2012.01)
  *G06Q 20/04*  (2012.01)
  (Continued)

(52) U.S. Cl.
  CPC ............. *G06Q 30/02* (2013.01); *G06Q 20/04* (2013.01); *G06Q 20/10* (2013.01);
  (Continued)

(58) Field of Classification Search
  CPC .. G06Q 2220/00; G06Q 20/02; G06Q 20/065; G06Q 20/4018; G06Q 20/10;
  (Continued)

(56) References Cited

U.S. PATENT DOCUMENTS

2018/0323962 A1   11/2018   Yanagisawa
2019/0079950 A1   3/2019   Ramabaja
(Continued)

FOREIGN PATENT DOCUMENTS

CN    108694575 A   10/2018
CN    109242685 A   1/2019
(Continued)

OTHER PUBLICATIONS

Dongcheng Li et al., "A_Survey_on_Blockchain_for_Enterprise_Using_Hyperledger_Fabric_and_Composer", https://ieeexplore.ieee.org, 2019.*

(Continued)

*Primary Examiner* — Thien T Mai
(74) *Attorney, Agent, or Firm* — Jefferson IP Law, LLP

(57) ABSTRACT

A user apparatus connectable to a block chain system is provided. The user apparatus includes a memory, a communication interface, and at least one processor configured to divide a block chain consisting of a plurality of blocks into an active area and an inactive area based on a predefined standard, store blocks included in the active area in a first portion of the memory, based on a transaction occurring in the block chain system, record information of the transaction in the blocks stored in the first portion of the memory, and control the communication interface to transmit transaction information satisfying a predefined condition among the transaction information stored in the first portion to a manager apparatus included in the block chain system.

18 Claims, 9 Drawing Sheets

(51) Int. Cl.
    *G06Q 20/10*     (2012.01)
    *H04L 9/06*     (2006.01)
    *H04L 9/00*     (2022.01)
    *G06Q 20/40*     (2012.01)

(52) U.S. Cl.
    CPC ....... *G06Q 20/4018* (2013.01); *H04L 9/0643* (2013.01); *H04L 9/50* (2022.05)

(58) Field of Classification Search
    CPC .. G06Q 20/04; G06Q 20/204; G06Q 20/3827; G06Q 20/3829; G06Q 20/3821; G06F 16/9027; G06F 16/2246; G06F 2216/03; G06F 21/6245; G06F 16/2465; H04L 2209/38; H04L 2209/56; H04L 9/0643
    See application file for complete search history.

(56) References Cited

U.S. PATENT DOCUMENTS

| | | | |
|---|---|---|---|
| 2019/0102758 A1 | 4/2019 | Wright et al. | |
| 2019/0340169 A1 | 11/2019 | Shima et al. | |
| 2019/0384932 A1* | 12/2019 | Pratt | G06F 21/6245 |
| 2021/0243007 A1* | 8/2021 | Kramer | G06Q 20/3827 |

FOREIGN PATENT DOCUMENTS

| | | |
|---|---|---|
| WO | 2019/120334 A2 | 6/2019 |
| WO | 2019/207504 A1 | 10/2019 |

OTHER PUBLICATIONS

International Search Report with Written Opinion dated Apr. 5, 2021; International Appln No. PCT/KR2021/000205.

Maymounkov et al.; Kademlia a Peer-to-peer Information System Based on the XOR Metric; New York Universitiy National Science Foundation; 2002.

Mazieres; The Stellar Consensus Protocol: A Federated Model for Internet-level Consensus; Stellar Development Foundation; Feb. 25, 2016.

Indian Examination Report dated Dec. 30, 2021, issued in Indian Patent Application No. 202041002191.

* cited by examiner

USER APPARATUS AND MANAGER APPARATUS INCLUDED IN BLOCKCHAIN NETWORK AND CONTROLLING METHOD THEREOF

CROSS REFERENCE TO RELATED APPLICATION(S)

This application is based on and claims priority under 35 U.S.C. § 119(a) of a provisional Indian patent application number 202041002191, filed on Jan. 17, 2020, in the Indian Intellectual Property Office, and of a completed Indian patent application number 202041002191, filed on Jul. 30, 2020, in the Indian Intellectual Property Office, and of Korean patent application number 10-2020-0137113, filed on Oct. 21, 2020, in the Korean Intellectual Property Office, the disclosure of each of which is incorporated by reference herein in its entirety.

BACKGROUND

1. Field

The disclosure relates to a Blockchain technology. More particularly, the disclosure relates to systems and methods that enable devices with computational and storage constraints to act as nodes in a Blockchain network.

2. Description of Related Art

Blockchain is a data structure that enables immutable storage of records of transactions among all participants (nodes) of the Blockchain network. The Blockchain refers to a chain of blocks, wherein each block is related to a previous block. The security of the Blockchain is maintained by the virtue of all the nodes having the same copy of the Blockchain. The integrity of the data stored in the Blockchain is maintained by establishing consensus amongst the validating nodes of the Blockchain. When the nodes arrive at a consensus to validate a transaction, a block can be added to the Blockchain to store the validated transaction.

However, as the number of transactions increases, the length of the Blockchain increases. When a new block is added to the Blockchain, the newly added block is received by all the nodes on the Blockchain. Therefore, the nodes that are participating in the Blockchain network need to be resource intensive, particularly in terms of storage capabilities (for storing the entire Blockchain) and computational capabilities (for validating the transactions that need to be stored in the Blockchain). Currently, the nodes of a Blockchain network are devices such as high-end desktops and servers.

The storage requirements (for hosting the Blockchain) and the computational requirements (for validating transactions using a large amount of data) are constraints, which prevent user devices such as smart phones, laptops, personal computers, tablets, and so on, to act as nodes of a Blockchain. The user devices can only function as Blockchain nodes, if the user devices are equipped with specialized hardware. The factors such as computational constraints, storage constraints and the non-inclination towards investment in specialized hardware in the user devices are the major factors that are limiting the wide-spread adoption of Blockchain.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide methods and systems for providing a light-weight mobile Blockchain framework for enabling user devices to participate as nodes in a Blockchain network, wherein the user devices are able to validate updates in the Blockchain and access the entire Blockchain without storing the entire copy of the Blockchain locally in the user devices.

Another aspect of the disclosure is to segment the Blockchain into an active part and an inactive part, wherein the active part comprises blocks that store recent transactions and the inactive part comprises a plurality of chunks that store previous transactions, wherein the criterion used for segmenting the Blockchain into active and inactive parts is based on a time factor, a storage factor, or any other dynamic factor.

Another aspect of the disclosure is to provide a state database in each device to store a summary of the inactive part of the Blockchain, wherein the summary comprises identities of individual users, who are part of the Blockchain network, and the number of tokens possessed by the users, wherein the tokens can represent the assets possessed by the users.

Another aspect of the disclosure is to store the active part of the Blockchain, the state database and a portion of the inactive part of the Blockchain, in the user devices, wherein the user devices can validate transactions and add blocks to the Blockchain using the active part of the Blockchain and the state database.

Another aspect of the disclosure is to replicate each of the chunks, comprising the inactive part of the Blockchain, a predefined number of times and store the chunks across user devices, wherein the predefined number is based on number of nodes required to be online for enabling other user devices to fetch chunks that are relevant to the user devices.

Additional aspects will be set forth in part in the description which follows and, in part, will be apparent from the description, or may be learned by practice of the presented embodiments.

In accordance with an aspect of the disclosure, a user apparatus connectable to a block chain system is provided. The user apparatus includes a memory, a communication interface, and at least one processor configured to divide a block chain consisting of a plurality of blocks into an active area and an inactive area based on a predefined standard, store blocks included in the active area in a first portion of the memory, based on a transaction occurring in the block chain system, record information of the transaction in the blocks stored in the first portion of the memory, and control the communication interface to transmit transaction information satisfying a predefined condition among the transaction information stored in the first portion to a manager apparatus included in the block chain system.

In accordance with another aspect of the disclosure, a manager apparatus is provided. The manager apparatus included in a block chain system includes a memory storing a block chain, a communication interface, and at least one processor configured to, based on the block chain being divided into an active area and an inactive area based on a predefined standard, replicate transaction information corresponding to the inactive area by a predefined number of times, and distribute and transmit the transaction information replicated by the predefined number of times to a plurality of user apparatuses included in the block chain system.

In accordance with another aspect of the disclosure, a method of controlling a user apparatus connectable to a block chain system is provided. The method includes the operations of dividing a block chain consisting of a plurality of blocks into an active area and an inactive area based on a predefined standard, storing blocks included in the active area in a first portion of the memory included in the user apparatus, based on a transaction occurring in the block chain system, recording information of the transaction in the blocks stored in the first portion of the memory, and transmitting transaction information satisfying a predefined condition among the transaction information stored in the first portion to a manager apparatus included in the block chain system.

In accordance with another aspect of the disclosure, a method of controlling a manager apparatus included in a block chain system is provided. The method includes the operations of, based on the block chain being divided into an active area and an inactive area based on a predefined standard, replicating transaction information corresponding to the inactive area by a predefined number of times, and distributing and transmitting the transaction information replicated by the predefined number of times to a plurality of user apparatuses included in the block chain system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
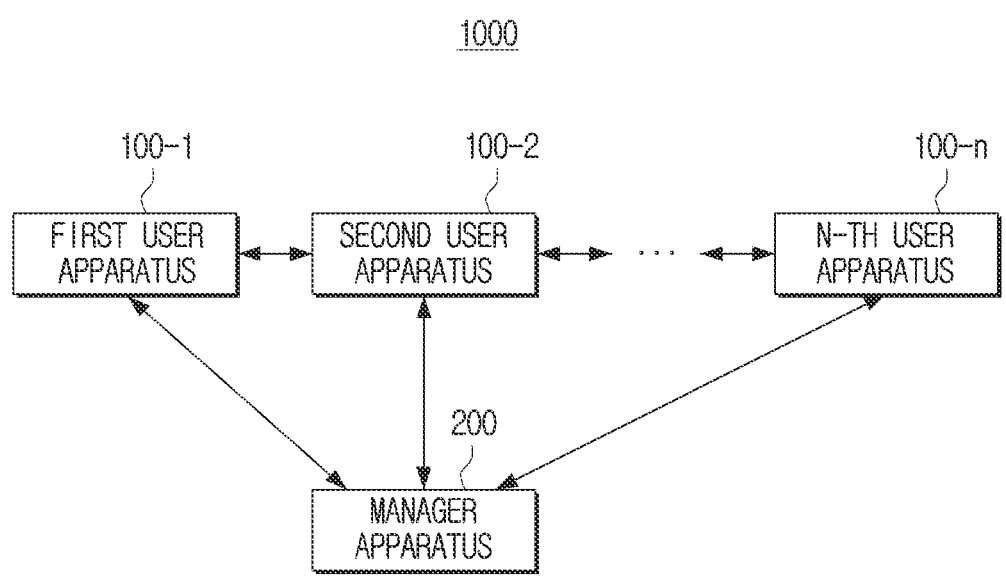
FIG. 1 is a block diagram for illustrating a block chain system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, expressions such as "have," "may have," "include," and "may include" should be construed as denoting that there are such characteristics (e.g., elements such as numerical values, functions, operations, and components), and the expressions are not intended to exclude the existence of additional characteristics.

Also, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

In addition, the expressions "first," "second," and the like, used in the disclosure may be used to describe various elements regardless of any order and/or degree of importance. Also, such expressions are used only to distinguish one element from another element, and are not intended to limit the elements. For example, a first user apparatus and a second user apparatus may refer to user apparatuses that are different from each other, regardless of any order or degree of importance. For example, a first element may be called a second element, and a second element may be called a first element in a similar manner, without departing from the scope of the disclosure.

Further, the terms "a module," "a unit," "a part," etc. used in the disclosure refer to elements performing at least one function or operation, and these elements may be implemented as hardware or software, or as a combination of hardware and software. In addition, a plurality of "modules," "units," "parts," etc. may be integrated into at least one module or chip and implemented as at least one processor, except a case wherein each of them needs to be implemented as individual specific hardware.

Also, the description in the disclosure that one element (e.g., a first element) is "(operatively or communicatively) coupled with/to" or "connected to" another element (e.g., a second element) should be interpreted to include both the case where the one element is directly coupled to the other element, and the case where the one element is coupled to the other element through still another element (e.g., a third element). In contrast, the description that one element (e.g., a first element) is "directly coupled" or "directly connected" to another element (e.g., a second element) can be interpreted to mean that still another element (e.g., a third element) does not exist between the one element and the other element.

In addition, the expression "configured to" used in the disclosure may be interchangeably used with other expressions such as "suitable for," "having the capacity to," "designed to," "adapted to," "made to" and "capable of," depending on cases. The term "configured to" does not necessarily mean that an apparatus is "specifically designed to" in terms of hardware. Instead, under some circumstances, the expression "an apparatus configured to" may mean that the apparatus "is capable of" performing an operation together with another apparatus or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory apparatus.

Further, the terms used in the disclosure are used just to explain certain embodiments of the disclosure, and are not intended to limit the scope of the other embodiments. Also, singular expressions may include plural expressions, unless obviously defined differently in the context. The terms used herein, including technical or scientific terms, may have meanings substantially identical to those generally known to those of ordinary skill in the art described in the disclosure. Terms defined in general dictionaries among the terms used in the disclosure may be interpreted to have the same meaning as or a similar meaning to the contextual meaning in the related art. Also, unless obviously defined in the disclosure, the terms used herein may not be interpreted to have an ideal or overly formal meaning. Depending on cases, even terms defined in the disclosure may not be interpreted to exclude the embodiments of the disclosure.

In the disclosure, the term "user" may refer to a person who uses an electronic apparatus or an apparatus using an electronic apparatus (e.g., an artificial intelligence electronic apparatus).

Hereinafter, the disclosure will be described in detail with reference to the drawings.

FIG. 1 is a diagram for illustrating a block chain system according to an embodiment of the disclosure.

Referring to FIG. 1, a block chain system 1000 according to the disclosure may include user apparatuses 100-1, 100-2, . . . , 100-n and a manager apparatus 200. The user apparatuses 100-1, 100-2, . . . , 100-n and the manager apparatus 200 may also be referred to as apparatuses or nodes.

The user apparatuses 100-1, 100-2, . . . , 100-n may act as nodes of a block chain network. Specifically, each of the user apparatuses 100-1, 100-2, . . . , 100-n may include a light-weight mobile block chain framework, and this enables the user apparatuses 100-1, 100-2, . . . , 100-n to act as nodes in a general block chain system 1000.

The user apparatuses 100-1, 100-2, . . . , 100-n may validate update of block chains and access the entire block chains without storing the entire block chains locally in the user apparatuses. Here, the entire block chains are block chains including information of transactions that occurred in the block chain system 1000, and they may include information of a plurality of transactions that occurred between the plurality of user apparatuses 100-1, 100-2, . . . , 100-n and the manager apparatus 200 included in the block chain system 1000.

When the user apparatuses 100-1, 100-2, . . . , 100-n perform transactions, blocks may be generated in block chains for storing the transactions and maintaining the records of the transactions. Here, as the number of the transactions increases, the number of the blocks of the block chains and the sizes of the block chains also increase.

Here, the user apparatuses 100-1, 100-2, . . . , 100-n may divide a block chain into an active area (or an active part) and an inactive area (or an inactive part). An active area of a block chain includes blocks storing recent transactions. Also, an inactive area of a block chain includes information of previous transactions. Here, a standard used for dividing a block chain into an active area and an inactive area may be based on a timestamp of a transaction, storage capability of a user apparatus, and/or a dynamic factor related to a specific user apparatus. Also, each of the user apparatuses 100-1, 100-2, . . . , 100-n may include a framework for easily segmenting a block chain into an active area and an inactive area.

The user apparatuses 100-1, 100-2, . . . , 100-n may store an inactive area of a block chain in forms of chunks. In the disclosure, a chunk means a data unit in a predefined size including transaction information included in a block chain. Specifically, transaction information included in an inactive area of a block chain may be replicated by a predefined number of times and stored in forms of encrypted chunks in the plurality of user apparatuses 100-1, 100-2, . . . , 100-n.

As described above, the disclosure includes features for storing an inactive area of a block chain in forms of encrypted chunks in the plurality of user apparatuses 100-1, 100-2, . . . , 100-n. That is, each chunk for an inactive area may be replicated by a predefined number of times, and stored in the plurality of user apparatuses 100-1, 100-2, . . . , 100-n. Here, the predefined number of times may be based on the number of nodes required for an on-line state such that another user apparatus can fetch chunks related to a user apparatus.

The user apparatuses 100-1, 100-2, . . . , 100-n may store summary information (or summary) for an inactive area. Each of the user apparatuses 100-1, 100-2, . . . , 100-n may include a state database for storing summary information of an inactive area. Here, the summary information may be constituted as key-value pairs related to all apparatuses (user apparatuses) which are parts of the block chain system 1000. Each of the key-value pairs includes the identity of a user of a user apparatus included in the block chain system 1000 and the number of tokens possessed by an individual user. In the disclosure, a token may indicate an asset possessed by a user.

Each of the user apparatuses 100-1, 100-2, . . . , 100-n may store an active area, a state database, and chunks in a predefined number included in an inactive area of a block chain.

In an embodiment, the user apparatuses 100-1, 100-2, . . . , 100-n may validate a transaction, and add blocks to a block chain by using the active area and the state database of the block chain.

Examples of the user apparatuses 100-1, 100-2, . . . , 100-n may include a smartphone, a laptop, a personal computer (PC), a tablet PC, a wearable apparatus, an Internet of Things (IoT) apparatus, etc., but the disclosure is not necessarily limited thereto.

The user apparatuses 100-1, 100-2, . . . , 100-n of the block chain system 1000 may be configured to follow a set of protocols. When the user apparatuses 100-1, 100-2, . . . , 100-n join a block chain network, the user apparatuses 100-1, 100-2, . . . , 100-n follow a set of protocols to act as nodes in the block chain network.

Here, a set of protocols is for providing/setting a standard for dividing a block chain, searching data stored in chunks separated from the other user apparatuses 100-1, 100-2, . . . , 100-n of the block chain, formulating policies for replicating chunks of the block chain from the other user apparatuses 100-1, 100-2, . . . , 100-n of the block chain network, and selecting an apparatus for storing the replicated chunks of the block chain.

Such protocols may be set by the manager of the block chain network.

In an embodiment, the manager of the block chain network may be single nodes/apparatuses (e.g., the user apparatuses 100-1, 100-2, . . . , 100-n) that generated the block chain network or a group of single nodes/apparatuses (e.g., the user apparatuses 100-1, 100-2, . . . , 100-n) that generated the block chain network. Specifically, as nodes keep joining the block chain network, at least one other node may take a role of operating as the manager of the block chain network through approval(s) of the current block chain network manager(s).

In another embodiment, protocols may be set by the manager apparatus 200. Here, the manager apparatus 200 may be implemented as a central server or various terminal apparatuses.

The manager apparatus 200 (hereinafter, the manager apparatus 200 includes the block chain network manager) may be connected with the user apparatuses 100-1, 100-2, . . . , 100-n through a cloud or a wired/wireless link.

As described above, a standard used for dividing a block chain into an active area and an inactive area may be based on a time factor and a storage factor, and such a standard used for segmentation of a block chain (a time factor and/or a storage factor) may be set by the manager apparatus 200.

That is, the manager apparatus 200 may set a standard used for diving a block chain into an active area and an inactive area, and transmit the set standard to each of the user apparatuses 100-1, 100-2, . . . , 100-n.

The manager apparatus 200 may transmit copies of a state database to each of the user apparatuses 100-1, 100-2, . . . , 100-n. Specifically, the manager apparatus 200 may generate a state database including summary information for an inactive area of a block chain, and transmit the generated state database to the user apparatuses 100-1, 100-2, . . . , 100-n included in the block chain system 1000.

Hereinafter, the user apparatus 100 and the manager apparatus 200 of the disclosure will be described in detail through the drawings.

Figure 2:
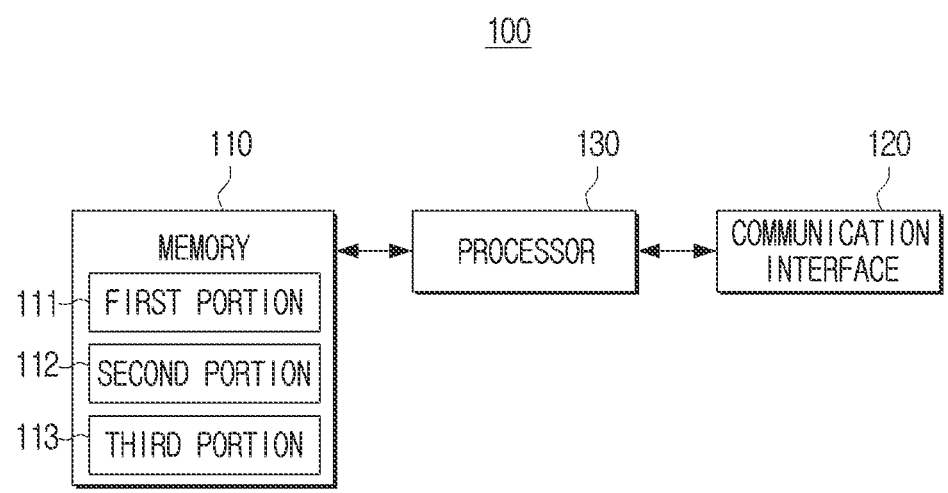
FIG. 2 is a block diagram for illustrating a configuration of a user apparatus according to an embodiment of the disclosure.

FIG. 2 is a block diagram for illustrating a configuration of a user apparatus according to an embodiment of the disclosure.

Referring to FIG. 2, a user apparatus 100 may include a memory 110, a communication interface 120, and at least one processor 130.

The memory 110 is a component for storing various kinds of programs and data, etc. necessary for operations of the user apparatus 100. The memory 110 may be implemented as a non-volatile memory, a volatile memory, a flash-memory, a hard disk drive (HDD), and/or a solid-state drive (SSD), etc. Also, the memory 110 may be accessed by the processor 130, and reading/recording/correction/deletion/update, etc. of data by the processor 130 may be performed. In the disclosure, the term memory may include the memory 110, a read-only memory (ROM) (not shown) inside the processor 130, a random-access memory (RAM) (not shown), and/or a memory card (not shown) mounted on the user apparatus 100 (e.g., a micro secure digital (SD) card, a memory stick, etc.).

The memory 110 may include a first portion or area 111, a second portion or area 112, and a third portion or area 113 based on the types of data stored or to be stored. Specifically, in the first area 111, blocks included in an active area of a block chain may be stored.

Also, in the second area 112, a state database including summary information for an inactive area of a block chain may be stored. In addition, in the third area 113, transaction information included in an inactive area of a block chain may be stored. Here, the summary information may include identification information and token information for the plurality of user apparatuses 100-1, 100-2, . . . , 100-n.

In an embodiment, the state database may be a table, and the number of the rows of the table may be identical to the number of the nodes of the user apparatuses 100-1, 100-2, . . . , 100-n of the block chain system 1000. The table may have two columns and here, the first column may store unique identification information of the user apparatuses 100-1, 100-2, . . . , 100-n, and the second column may store information of tokens possessed by a user who possesses the user apparatuses 100-1, 100-2, . . . , 100-n. For example, in case one million nodes exist in the block chain system 1000, the number of the rows of the state database may be one million. Here, if the size of each unique identification number is 40 bytes and the size of data indicating the number of tokens is 8 bytes, each of the user apparatuses 100-1, 100-2, . . . , 100-n included in the state database may occupy 48 bytes. In case one million user apparatuses are considered, the size of the state database may be approximately 48 megabytes (MB).

In the third area 113, the transaction information corresponding to an inactive area may be stored in forms of encrypted chunks.

The communication interface 120 is a component for making the user apparatus 100 perform communication with an external electronic apparatus like the manager apparatus 200. The user apparatus 100 may receive various data such as a block chain network protocol, a state database, and encrypted chunks for an inactive area from the manager apparatus 200 through the communication interface 120.

The communication interface 120 may include various communication modules such as a wired communication module (not shown), a near field wireless communication module (not shown), a wireless communication module (not shown), etc.

Here, a wired communication module is a module for performing communication with an external apparatus (not shown) according to a wired communication method such as a wired Ethernet. A near field wireless communication module is a module for performing communication with an external apparatus (not shown) located in a near field according to a near field wireless communication method such as Bluetooth (BT), Bluetooth Low Energy (BLE), and Zigbee methods, etc. Also, a wireless communication module is a module that is connected to an external network according to a wireless communication protocol such as Wi-Fi, IEEE, etc., and performs communication with an external apparatus (not shown) and a voice recognition server (not shown). In addition to the above, a wireless communication module may further include a mobile communication module that accesses a mobile communication network according to various mobile communication protocols such as 3rd Generation (3G), 3rd Generation Partnership Project (3GPP), Long Term Evolution (LTE), LTE Advanced (LTE-A), 5G Networks, and the like, and performs communication.

The processor 130 controls the overall operations of the user apparatus 100.

According to an embodiment, the processor 130 may be implemented as a digital signal processor (DSP), a microprocessor, and/or a time controller (TCON). However, the disclosure is not limited thereto, and the processor 130 may include one or more of a CPU, a micro controller unit (MCU), a micro processing unit (MPU), a controller, an application processor (AP), a communication processor (CP), and an advanced RISC Machine (ARM) processor, or may be defined by the terms. Also, the processor 130 may be implemented as a system on chip (SoC) having a processing algorithm stored therein or large-scale integration (LSI), or in the form of a field programmable gate array (FPGA).

In addition, the processor 130 may be implemented as a graphic-dedicated processor such as a graphic processing unit (GPU), a vision processing unit (VPU), etc., or an artificial intelligence-dedicated processor such as a neural processing unit (NPU), and the like.

Further, the processor 130 may include a volatile memory such as an SRAM, etc.

Figure 3:
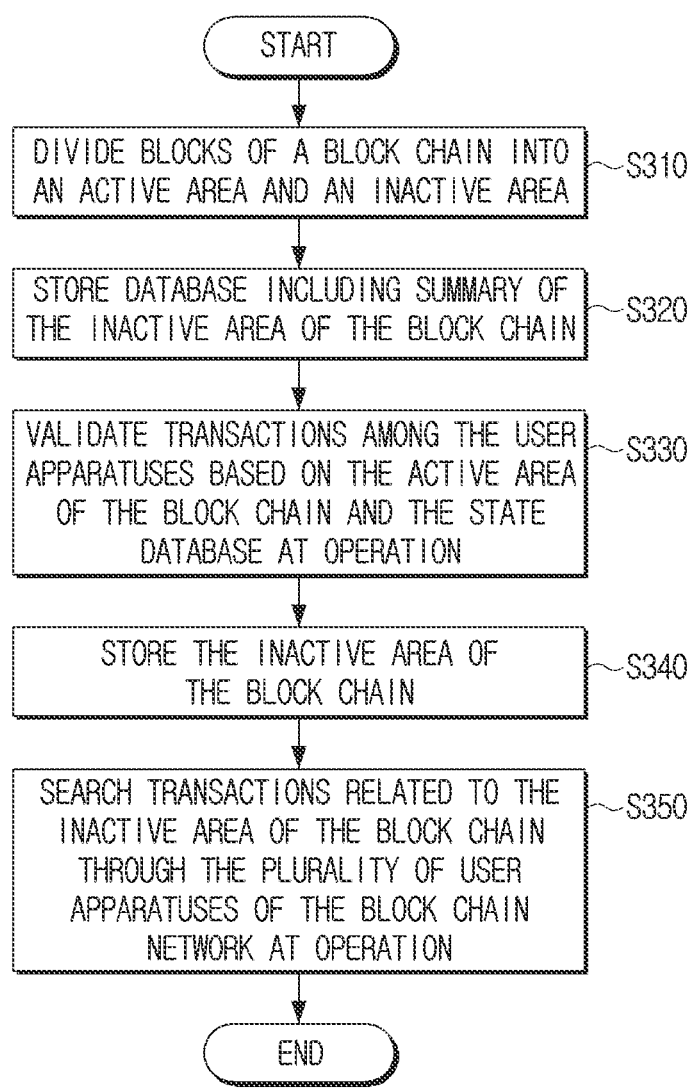
FIG. 3 is a flow chart for illustrating an operation of a user apparatus according to an embodiment of the disclosure.

FIG. 3 is a flow chart for illustrating an operation of a user apparatus according to an embodiment of the disclosure.

Referring to FIG. 3, a detailed operation of the user apparatus 100 having the aforementioned configuration will be described through FIG. 3.

The processor 130 may divide blocks of a block chain into an active area and an inactive area at operation S310. As described above, a standard used for dividing a block chain (a time factor and/or a storage factor) may be set by the block chain network manager and/or the manager apparatus 200.

The processor 130 may store blocks included in an active area in the first area 111 of the memory 110, and store at least one transaction information included in an inactive area in the third area 113 of the memory 110 based on a predefined standard.

When a transaction occurs in the block chain system 1000, the processor 130 may record information of the transaction that occurred in a block stored in the first area of the memory 110.

Then, if transaction information satisfying a predefined condition exists among the transaction information stored in the first area 111, the processor 130 may update the state database stored in the second area 112 of the memory 110 based on the transaction information satisfying the predefined condition, and upload the updated state database to the block chain system 1000. Here, the predefined condition may include a case wherein transaction information included in a block of an active area moves to an inactive area based on the standard for dividing a block chain into an active area and an inactive area.

Then, the processor 130 may control the communication interface 120 to transmit the transaction information satisfying the predefined condition among the transaction information stored in the first area 111 to the manager apparatus 200 included in the block chain system 1000.

In an embodiment, it is assumed that a block including an active area include transactions performed for the previous five days. Also, it is assumed that the current date is June 29. In this scenario, a block including transactions performed after June 25 may be included in an active area of a block chain. Transactions performed before the previous five days may be stored in chunks including an inactive area of a block chain. For example, transactions performed before June 25 may be included in chunks including an inactive area of a block chain.

Here, the processor 130 may store a block including transactions performed on June 25 in the first area 111 of the memory 110 from June 25 until before June 29, and when the current date becomes June 29, the processor 130 may identify the transactions performed on June 25 as transaction information corresponding to the inactive area, and transmit the information to the manager apparatus 200.

In another embodiment, each block may be configured to store transactions in a limited number, such that the size of the block can be fixed. An active area of a block chain may be constituted to include blocks in a predefined number, and this allows fixation of the size of the active area of the block chain. Here, the manager of the block chain network or the manager apparatus 200 may set the size of the active area of the block chain.

If the number of transactions increased and there is a need that blocks are added to the block chain for accommodating recent transactions, the processor 130 may make the oldest block of the active area of the block chain move from the active area of the block chain to the inactive area of the block chain. Specifically, the processor 130 may control the communication interface 120 to transmit information on the oldest block of the active area of the block chain or transaction information included in the oldest block to the manager apparatus 200. Alternatively, according to an embodiment, the processor 130 may store information on the oldest block of the active area of the block chain or transaction information included in the oldest block in the third area 113 of the memory 110. Here, the processor 130 may store at least one of the transaction information included in the inactive area in the third area 113 of the memory 110 based on a request of the manager apparatus 200.

For example, it is assumed that a space required for storing a transaction in a block is 0.1 MB. Also, each block is configured to store 10 transactions at the maximum. Accordingly, the size of a block may not exceed 1 MB. If a block includes 10 transactions and a new transaction is performed, in case the transaction was validated by the nodes of the block chain, a new block may be generated for storing the transaction. Here, it is assumed that the active part of the block chain may not exceed 20 MB. Accordingly, the active area of the block chain may consist of 20 blocks and each block may store 10 transactions, and thus the active area may include 200 transactions in total. If valid transactions exceeding 200 are performed, the processor 130 may transmit the oldest block of the active area to the manager apparatus 200 such that the oldest block of the active part of the block chain may move to the inactive part of the block chain, or store the oldest block of the active area in the third area 113 of the memory 110. Alternatively, the processor 130 may store transaction information in the third area 113 of the memory 110 based on a request of the manager apparatus 200.

Here, in case the user apparatuses 100-1, 100-2, . . . , 100-*n* in the block chain system 1000 performed 5000 transactions, the recent 200 transactions may be stored in the active area of the block chain, and the previous 4800 transactions may be stored in the chunks of the inactive area of the block chain.

If a transaction is performed with another user apparatus among the plurality of user apparatuses 100-1, 100-2, . . . , 100-*n*, the processor 130 may notify occurrence of the transaction to the other user apparatuses 100*a*-100*n* of the block chain network. The communication interfaces of the other user apparatuses 100-1, 100-2, . . . , 100-*n* may receive notification indicating occurrence of the transaction.

The other user apparatuses 100-1, 100-2, . . . , 100-*n* may reach a consensus regarding whether the transaction may be stored in a block in the active part of the block chain. Here, the processor 130 may validate the transaction and update the block chain by storing the transaction in the active part of the block chain. If the other user apparatuses 100-1, 100-2, . . . , 100-*n* do not reach a consensus, and the transaction exceeds a predefined percentage (e.g., 50%) of the apparatuses 100*a*-100*n* and is not validated, the processor 130 may not update the block chain.

The processor 130 may store the state database including summary of the inactive area of the block chain in the second area 112 at operation S320.

Specifically, the processor 130 may receive the state database including summary information for the inactive area from the block chain network manager and/or the manager apparatus 200.

When the state database including summary information for the inactive area is received from the manager apparatus 200, the processor 130 may store the received state database in the second area 112 of the memory 110.

The state database may include key-value pairs consisting of unique identities of users participating in the block chain network and information of tokens possessed by each user. Here, each user may correspond to one user apparatus 100-1, 100-2, . . . , 100-*n*, and each of the user apparatuses 100-1, 100-2, . . . , 100-*n* may have a unique identification number. Also, each unique identification number may be mapped to the numbers of the tokens possessed by the users possessing the user apparatuses 100-1, 100-2, . . . , 100-*n*.

That is, the summary information included in the state database may include identification information and token information for the plurality of user apparatuses 100-1, 100-2, . . . , 100-*n* included in the block chain system 1000. For example, in case 5000 transactions occurred in the block chain system 1000 and information of 200 transactions is stored in the active area of the block chain, the state database may include information of tokens possessed by the users of the user apparatuses 100-1, 100-2, . . . , 100-*n* after 4800 transactions were performed.

In the disclosure, a token may be considered as an abstract number indicating assets possessed by a user. Exemplary assets may be currency, credit points, goods, products, data, etc. depending on the field of application of the block chain, but are not necessarily limited thereto. According to a selection of the user of the user apparatus 100, assets or currency may be added to the account of the user apparatus 100, and this may be converted to a token.

Also, when the user apparatus 100 performs a transaction, a token may be credited to or debited from the account of the user apparatus 100.

The block chain network manager and/or the manager apparatus 200 may transmit the updated state database to the user apparatuses 100-1, 100-2, . . . , 100-*n* of the block chain system, and the user apparatuses 100-1, 100-2, . . . , 100-*n* may receive the updated state database from the manager apparatus 200.

According to another embodiment, the processor 130 may update the state database. For example, in case transaction information stored in the oldest block of the active area of the block chain moves to the inactive area, the processor 130 may update the number of the tokens possessed by the user apparatus related to the transaction stored in the oldest block of the active area of the block chain according to the information of the transaction stored in the oldest block. For example, in case a user apparatus A and a user apparatus B are related to the transaction stored in the oldest block of the active area of the block chain, the processor 130 may update the number of the tokens of the user apparatus A and the user apparatus B included in the state database.

In an ideal scenario, the active area of the block chain stored in the memory of each of the user apparatuses 100-1, 100-2, . . . , 100-*n* and the state database should be identical. However, in case an act of at least one user apparatus 100 is determined to be a rogue act and a fraudulent transaction is validated, the copy of the active area of the block chain stored in each of the user apparatuses 100-1, 100-2, . . . , 100-*n* and the copy of the state database may be damaged.

Accordingly, for maintaining the active area of the block chain stored in the memory of each of the user apparatuses 100-1, 100-2, . . . , 100-*n* and the state database to be identical, if a new transaction occurs in the block chain system 1000, the processor 130 may validate the new transaction and arrive at a consensus regarding the validation result. Specifically, the processor 130 may perform a consensus regarding whether there is a need that a transaction is added as a block to the active area of the block chain or included in a block currently existing in the active area of the block chain. A method selected for arriving at a consensus may be based on scalability, latency, and/or openness membership of the method.

The processor 130 may validate transactions among the user apparatuses 100-1, 100-2, . . . , 100-*n* based on the active area of the block chain and the state database at operation S330. Here, the processor 130 may perform validation for a transaction that occurred in the block chain system 1000 by using the state database stored in the second area 112, and record the information of the validated transaction in the blocks stored in the first area 111.

Specifically, when a new transaction occurs, the processor 130 may perform validation for the transaction that occurred in the block chain system 1000 based on the information of transactions included in the blocks stored in the first area 111 and the summary information of the state database stored in the second area.

For example, a case wherein a transaction is performed between a user apparatus A and a user apparatus B, and ten tokens are transmitted from the user apparatus A to the user apparatus B may be assumed. If it is assumed that the user apparatus A had 39 tokens, and the user apparatus B had 20 tokens before the transaction, the processor 130 may validate the transaction by determining the number of the tokens corresponding to the user apparatus A and the user apparatus B.

In case the transaction was completed and it was determined that the user apparatus A has 29 tokens and the user apparatus B has 30 tokens, the processor 130 may validate the transaction by arriving at a consensus including transaction information in the active area of the block chain with another user apparatus.

Then, the processor 130 may include the information of the validated transaction in an existing block of the active area of the block chain or store the information of the transaction in a new block.

A case wherein entries or key-value pairs added to the state database stored in the second area 112 increase and the space of the second area 112 becomes insufficient may occur. For example, in case the size of the second area 112 of the memory 110 is 500 MB, and the size of the state database exceeds 500 MB, the second area 112 of the memory 110 may no longer be sufficient for storing the state database.

Here, the processor 130 may receive portions of the state database in forms of distributed hash tables from the block chain network manager or the manager apparatus 200. Specifically, the block chain network manager or the manager apparatus 200 may convert the state database into a plurality of distributed hash tables, and here, the distributed hash tables corresponding to portions of the state database may be stored in the user apparatuses 100-1, 100-2, . . . , 100-n in a predefined number of the block chain system 1000. Detailed explanation in this regard will be made with reference to FIG. 4.

The processor 130 may store the inactive area of the block chain at operation S340. Specifically, if transaction information included in the active area of the block chain corresponds to the inactive area, the processor 130 may transmit the transaction information to the manager apparatus 200. Here, as a protocol dividing the block chain into an active area and an inactive area is set by the manager apparatus 200 and transmitted to the plurality of user apparatuses 100-1, 100-2, . . . , 100-n, the transaction information of the inactive area that the manager apparatus 200 receives from the plurality of user apparatuses 100-1, 100-2, . . . , 100-n may be identical.

The processor 130 may store at least one of the transaction information included in the inactive area in the third area of the memory 110 according to a request of the manager apparatus 200. Specifically, the manager apparatus 200 may divide the inactive area including the received transaction information into a plurality of chunks, and transmit the divided chunks including the inactive area to the user apparatus 100.

According to an embodiment, for ensuring that chunks were not modulated, the processor 130 may receive encrypted chunks from the manager apparatus 200. Detailed explanation in this regard will be made with reference to FIG. 4.

As the chunks of the inactive area stored in the user apparatus 100 include some transaction information corresponding to the inactive area, the processor 130 may search transactions related to the inactive area of the block chain through the plurality of user apparatuses 100-1, 100-2, . . . , 100-n of the block chain network at operation S350.

The processor 130 may request history information of a transaction that occurred in the block chain system 1000 to the manager apparatus 200, and receive transaction information corresponding to the requested history information in the inactive areas of the block chain that are distributed and stored among the plurality of user apparatuses in the block chain system through the manager apparatus 200. Here, the history information of the transaction may include information of the transaction included in the inactive area.

Specifically, in case the processor 130 aims to access a chunk of the inactive area of the block chain, the processor 130 may issue a query for searching the chunk, and transmit the query to at least one user apparatus including the relevant chunk through the manager apparatus 200.

Here, the processor 130 may receive the relevant chunk together with the first hash and the second hash of the related chunk from at least one user apparatus through the manager apparatus 200. According to an embodiment, for ensuring that the related chunk was not modulated, the processor 130 may receive the first hash for all chunks of the inactive area of the block chain from the oldest chunk wherein the relevant transaction is stored to the recent chunk.

In this case, the processor 130 may validate the received transaction information by comparing hash data corresponding to the transaction information and hash data included in the header of at least one block among the blocks stored in the first area 111.

The various operations in FIG. 3 are not necessarily performed according to the disclosed order, but they may be performed in a different order from the order in FIG. 3 or performed simultaneously. Also, in some embodiments, some operations listed in FIG. 3 may be omitted.

Figure 4:
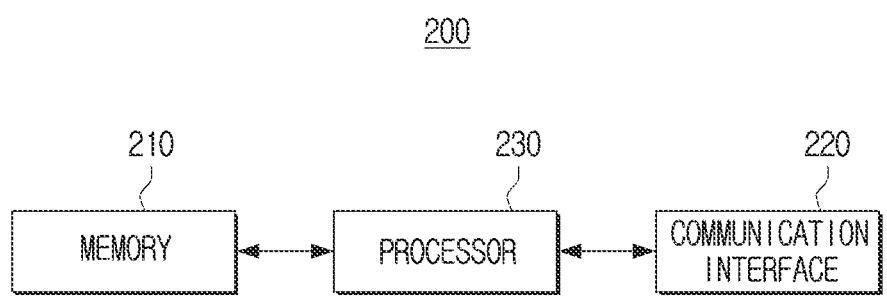
FIG. 4 is a block diagram for illustrating a configuration of a manager apparatus according to an embodiment of the disclosure.

FIG. 4 is a block diagram for illustrating a configuration of a manager apparatus according to an embodiment of the disclosure. As the block chain network manager also performs the same functions and operations as the manager apparatus 200, it may include the components in FIG. 4.

Referring to FIG. 4, the manager apparatus 200 may include a memory 210, a communication interface 220, and at least one processor 230. In this regard, parts overlapping with the memory 110, the communication interface 120, and the processor 130 of the user apparatus 100 in FIG. 2 will be omitted, for the convenience of explanation.

The memory 210 is a component for storing various kinds of programs and data, etc. necessary for operations of the manager apparatus 200.

In the memory 210, a block chain including information of transactions that occurred in the block chain system 1000 may be stored. Also, in the memory 210, information on an inactive area received from the plurality of user apparatuses 100-1, 100-2, . . . , 100-n may be stored. Here, the information on an inactive area may include information on a plurality of chunks including the inactive area, information on the number of times of replicating each of the plurality of chunks, and information on the user apparatuses wherein each of the plurality of chunks is stored.

Also, in the memory 210, the state database including summary information for the inactive area may be stored. Here, the summary information may include identification information and token information for the plurality of user apparatuses included in the block chain system.

The communication interface 220 is a component for the manager apparatus 200 to perform communication with the plurality of user apparatuses 100-1, 100-2, . . . , 100-n in the block chain system 1000.

The manager apparatus 200 may receive information on the inactive area from the plurality of user apparatuses 100-1, 100-2, . . . , 100-n through the communication interface 200, or transmit chunks for the inactive area or transmit a state database for the inactive area.

The processor 230 controls the overall operations of the manager apparatus 200.

When the block chain is divided into an active area and an inactive area by the user apparatus 100 based on a predefined standard, the processor 230 may divide the inactive area into a plurality of chunks. Then, the processor 230 may transmit the plurality of divided chunks to the plurality of user apparatuses 100-1, 100-2, ..., 100-*n*.

Here, the processor 230 may replicate transaction information corresponding to the inactive area by a predefined number of times. Specifically, the processor 230 may replicate the divided chunks by a predefined number of times based on a predefined protocol. Here, the predefined protocol may request to store the replicated chunks in the plurality of user apparatuses 100-1, 100-2, ..., 100-*n*. Accordingly, the processor 230 may transmit the chunks replicated based on the predefined protocol to the plurality of user apparatuses 100-1, 100-2, ..., 100-*n*.

For example, if the inactive area of the block chain consists of 400 chunks and each chunk is replicated four times, the inactive area of the block chain may consist of 1600 chunks. The processor 230 may transmit the 1600 chunks to the plurality of user apparatuses 100-1, 100-2, ..., 100-*n*. Here, the plurality of user apparatuses 100-1, 100-2, ..., 100-*n* may be user apparatuses that volunteered to store the chunks or user apparatuses selected by the processor 230. Here, the chunks may be distributed evenly, and each of the 1600 user apparatuses may store a single chunk.

In an embodiment, the predefined protocol may ensure that the transaction information or the chunks constituting the inactive area of the block chain are not damaged. Accordingly, the processor 230 may identify the state of the plurality of user apparatuses that received the replicated transaction information.

Then, the processor 230 may manage the block chain system 1000 such that a user apparatus that stored a plurality of replicated copies for one chunk may be in an on-line state.

Specifically, based on the state information of the user apparatuses that received the replicated transaction information, the processor 230 may identify whether the state of the user apparatuses is off-line. In case the state of the user apparatuses in a predefined number among the plurality of user apparatuses that received the replicated transaction information is an off-line state, the processor 230 may transmit the plurality of transaction information to another user apparatus included in the block chain system 1000.

For example, in case 50% of the user apparatuses 100-1, 100-2, ..., 100-*n* storing a specific chunk are converted to off-line, i.e., in case two among four user apparatuses storing a specific chunk are converted to off-line, the manager apparatus 200 may replicate the specific chunk, and transmit the replicated chunk to the other two user apparatuses. Accordingly, the processor 230 may ensure that the chunk can be searched by the user apparatus 100 in the block chain system 1000.

In an embodiment, it may be assumed that 20000 transactions occurred in the block chain system 1000, and 800 recent transactions are stored in the active area of the block chain. In this case, the remaining 19200 transactions may be stored in chunks constituting the inactive area of the block chain. If it is assumed that there are 400 chunks in the inactive area of the block chain, each chunk may store information of 48 transactions at the maximum. Also, each of the 19200 transactions may be replicated four times with replication of each of the 400 chunks.

As described above, as the number of transactions increases, the size of the block chain increases, and the inactive area of the block chain also increases, and accordingly, more chunks are generated. As the number of chunks increases, more user apparatuses 100 may be used for storing the added chunks. Here, the manager apparatus 200 may manage the block chain system 1000 such that chunks constituting the inactive area of the block chain are distributed to the user apparatuses evenly.

The processor 230 may perform numbering for the chunks of the inactive area. Also, the processor 230 may assign identification numbers and replicated version numbers for each chunk. Here, as the number of the chunks constituting the inactive area of the block chain increases, the identification numbers of the chunks may also increase. For example, if an example wherein 400 chunks exist and each chunk was replicated four times is assumed, the oldest chunks may be numbered as $C_{1-1}, C_{1-2}, C_{1-3},$ and $C_{1-4}$, and the most recent chunks may be numbered as $C_{400-1}, C_{400-2}, C_{400-3}, C_{400-4}$.

In case the processor 230 receives a query requesting history information of a transaction from the user apparatus 100, the processor 230 may transmit the query to all user apparatuses 100-1, 100-2, ..., 100-*n* storing chunks including the inactive area of the block chain. Here, the plurality of user apparatuses storing the chunk including the transaction related to the query may transmit the chunk to the manager apparatus 200.

Specifically, when the processor 230 transmits a query for searching a specific chunk to the plurality of user apparatuses, the user apparatuses storing the specific chunk may transmit the chunk number or any metadata to the manager apparatus 200. When the chunk including the related transaction is searched, the processor 230 may transmit the searched chunk to the user apparatus 100 that requested the query.

According to an embodiment, for ensuring that the chunk searched through the plurality of user apparatuses 100-1, 100-2, ..., 100-*n* was not modulated, the processor 230 may encrypt the chunks of the inactive area of the block chain before transmitting the chunk to the user apparatus 100. Here, the header of the chunk may consist of a first hash, a second hash, and optional metadata. Here, the first hash includes the encrypted hash of the header of the previous chunk of the searched chunk, and the second hash includes the Merkle root of the transaction hash stored in the searched chunk. The plurality of user apparatuses that store the searched chunk may transmit the first hash and the second hash associated with the searched chunk to the manager apparatus 200 together with the searched chunk.

The processor 230 may transmit the searched chunk and hash data sequentially to the user apparatus that requested the history information of the transaction. Also, for ensuring that the chunks included in the history information were not modulated, the processor 230 may transmit the first hashes of all the chunks of the inactive area of the block chain from the oldest chunk storing the related transaction to the recent chunk to the user apparatus 100.

For example, a case wherein the user apparatus 100-1 requests history information of a transaction is assumed. In this case, it is assumed that chunks including the transaction related to the requested history information are $C_{45-(x)}, C_{31-(x)}, C_{16-(x)}$ (X may be 2, 3, 4, ..., n, and here, n is the number of copies for each chunk based on a protocol).

In this case, the manager apparatus 200 may transmit contents received from the plurality of user apparatuses together with the first hashes of the chunks $C_{16-(x)}$-$C_{the\ recent\ chunk-(x)}$ to the user apparatus 100-1 that requested the history information of the transaction. In this case, the user apparatus 100-1 may validate whether $C_{45-(x)}, C_{31-(x)},$ $C_{16-(x)}$ were modulated by using the first hash of the oldest block of the active area of the block chain. This is because modulation of the content of the chunk $C_{16-(x)}$ leads to modulation of the hash of the chunk $C_{16-(x)}$, and the hashes of all the chunks after $C_{16-(x)}$ including the first hashes of the blocks of the active area of the block chain are changed.

According to an embodiment, in the case of receiving a request of the user apparatus 100 to access the entire copy of the block chain, the processor 230 may transmit the entire copy of the block chain by using the entire copy of the block chain stored in the memory 210.

According to another embodiment, the processor 230 may generate a state database including summary information for the inactive area of the block chain, and transmit the generated state database to a user apparatus included in the block chain system.

Here, if the user apparatus 100 joins the block chain system 1000, the processor 230 may generate an entry (a key-value pair) in the state database. The entry may include the unique identification number of the user apparatus 100 and information of the tokens possessed by the user apparatus 100. The processor 230 may generate an account for storing the tokens of each user apparatus.

In case the nodes of the block chain network increase or the transaction information included in the inactive area increases, the size of the state database of the user apparatus 100 may increase.

As described above, in case the state database is updated by a user apparatus and satisfies a predefined condition, the processor 230 may distribute and transmit the summary information included in the updated state database to the plurality of user apparatuses included in the block chain system 1000. Here, the predefined condition may indicate a case wherein the size of the state database is identical to the size of the second area 112 of the user apparatus 100, or is greater than or equal to a predefined ratio (e.g., 80%) of the size of the second area 112.

Specifically, the processor 230 may convert the state database to forms of distributed hash tables. Then, the processor 230 may manage the block chain system 1000 such that hash tables corresponding to portions of the state database are stored in the user apparatuses in a predefined number of the block chain network. Here, the user apparatuses in a predefined number may be determined based on at least one of the history of transactions performed by the user apparatuses, a bandwidth that can be used for a user apparatus to perform communication with another user apparatus, and storage capacity of the user apparatuses.

Figure 5A:
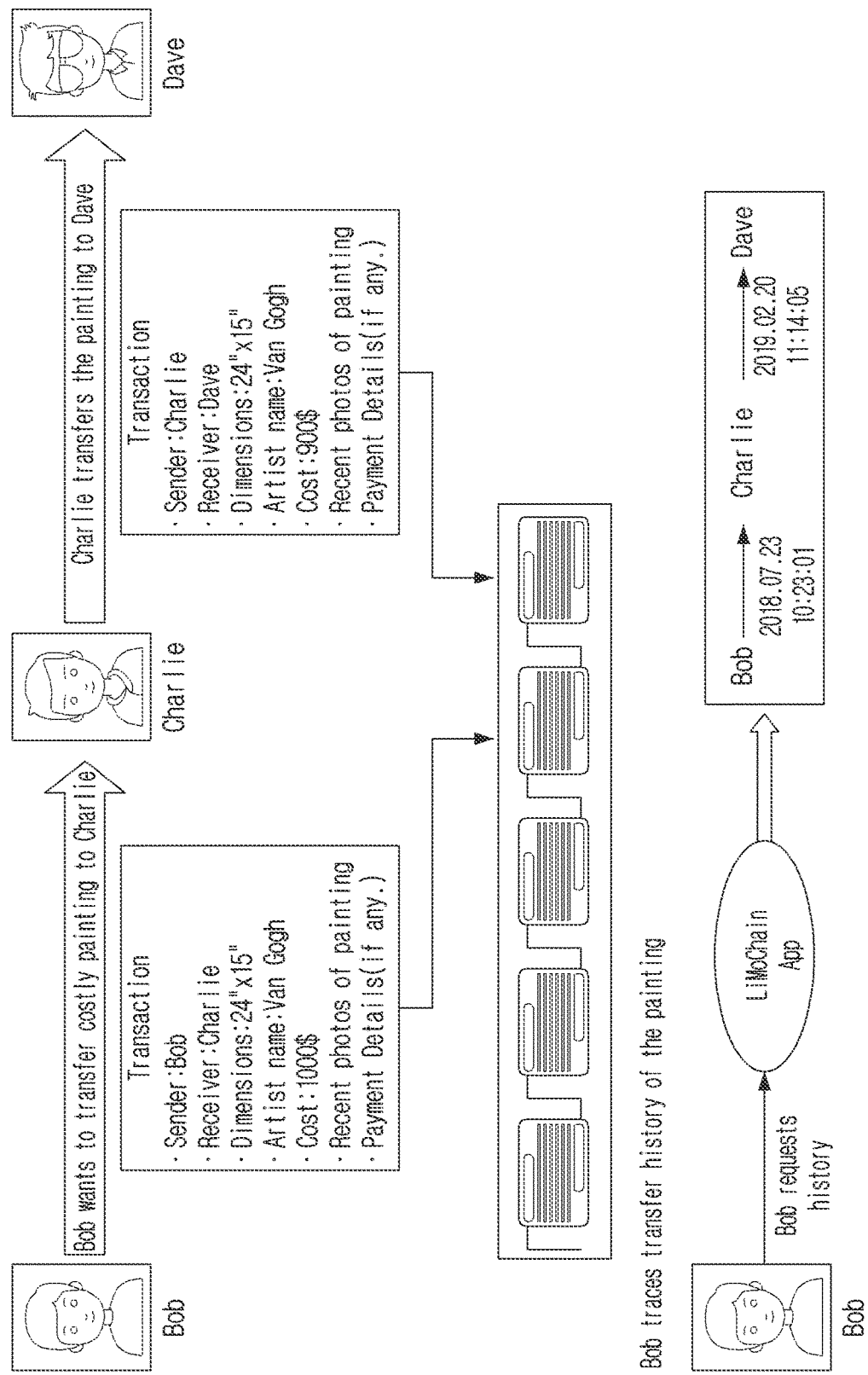
FIG. 5A is a diagram for illustrating a user apparatus that performs peer-to-peer (P2P) resource management by using a block chain network according to an embodiment of the disclosure.

FIG. 5A is a diagram for illustrating a user apparatus that performs peer-to-peer (P2P) resource management by using a block chain network according to an embodiment of the disclosure.

Figure 5B:
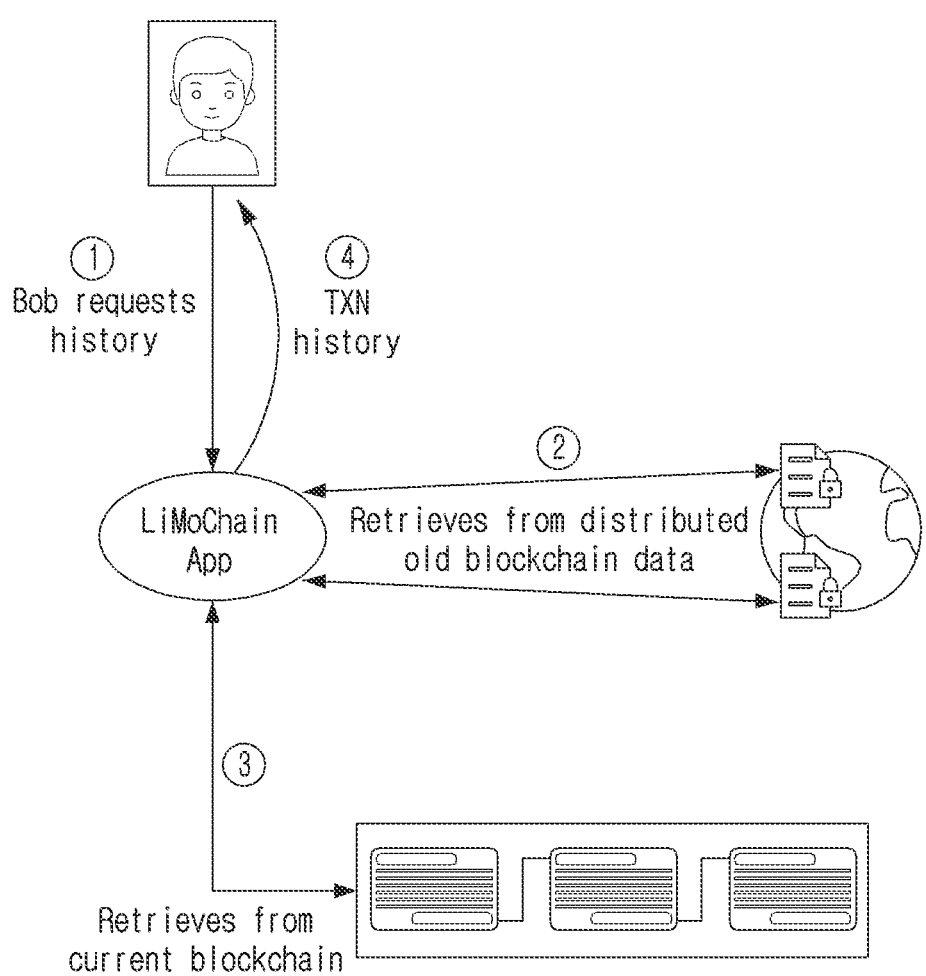
FIG. 5B is another diagram for illustrating a user apparatus that performs P2P resource management by using a block chain system according to an embodiment of the disclosure.

FIG. 5B is another diagram for illustrating a user apparatus that performs P2P resource management by using a block chain system according to an embodiment of the disclosure.

FIGS. 5A and 5B illustrate a scenario wherein a user apparatus including a light-weight mobile (LIMO) block chain framework performs P2P resource management according to an embodiment of the disclosure. The light-weight mobile block chain framework may be used for managing resources in a P2P environment. The light-weight mobile block chain framework may act as a decentralized immutable ledger for keeping track of resource ownership and associated data such as the cost of resources and the state of resources, etc.

Referring to FIG. 5A, Bob sold a painting to Charlie by using a preferred payment gateway. The painting was an asset of Bob which has been sold to Charlie, and Bob is credited with tokens. Here, the number of the tokens credited to Bob is identical to the number of the tokens debited from Charlie. It may be assumed that Charlie sells the painting to Dave in turn. The block chain (ledger) may store the entire trail of the ownership of the painting, together with all associated data.

Here, in case Bob requests history information of the transaction (①  in FIG. 5B), the processor 130 may request the history information of the transaction to the manager apparatus 200 of the block chain system 1000.

In this case, the processor 230 of the manager apparatus 200 may transmit a query related to the requested transaction to all user apparatuses storing chunks for the inactive area, and receive a related chunk from the plurality of user apparatuses storing chunks including the transaction history information (② in FIG. 5B).

Also, the processor 130 may search information of recent transactions from the blocks of the active area stored in the first area 111 of the memory 110 (③ in FIG. 5B).

Based on the related chunk and the searched information of recent transactions received from the plurality of user apparatuses, the processor 130 may acquire the history information of the transaction (④ in FIG. 5B).

As described above, the light-weight mobile block chain framework may facilitate any related user who wishes to trace the trail of the ownership of the painting at a time point in the future.

Figure 6:
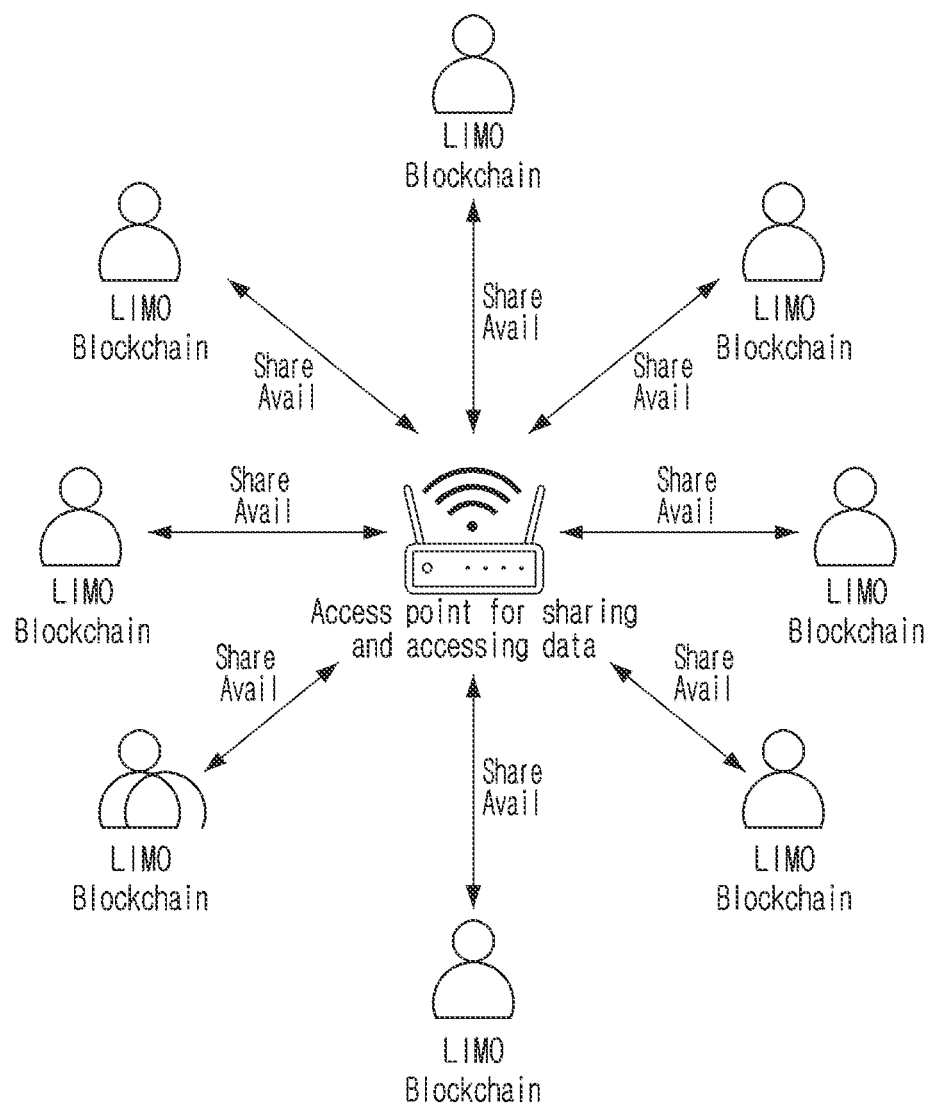
FIG. 6 is a diagram for illustrating a user apparatus that shares data with another user apparatus by using a block chain system according to an embodiment of the disclosure.

FIG. 6 is a diagram for illustrating a user apparatus according to an embodiment of the disclosure.

Referring to FIG. 6, a scenario is shown wherein a user apparatus including a LIMO block chain framework shares data with other user apparatuses and tracks data consumption of each user apparatus.

For example, it is assumed that the user apparatus 100 subscribed to a data plan wherein the user is allocated with 100 GB of data per month, but the user apparatus does not use the quota of 100 GB.

Here, the user apparatus may share the data that is not utilized with other user apparatuses. Likewise, in case the other user apparatuses cannot use the quota of the data respectively allocated to them, the other user apparatuses may also share the data.

In this scenario, when the user apparatus shares the data of another user apparatus, tokens may be credited to the user of the other user apparatus, and tokens may be debited from the user of the user apparatus using the data.

Here, the number of the tokens that are credited/debited may be based on the amount of data transmitted among the users, and transmission of data may be considered as transactions.

Figure 7:
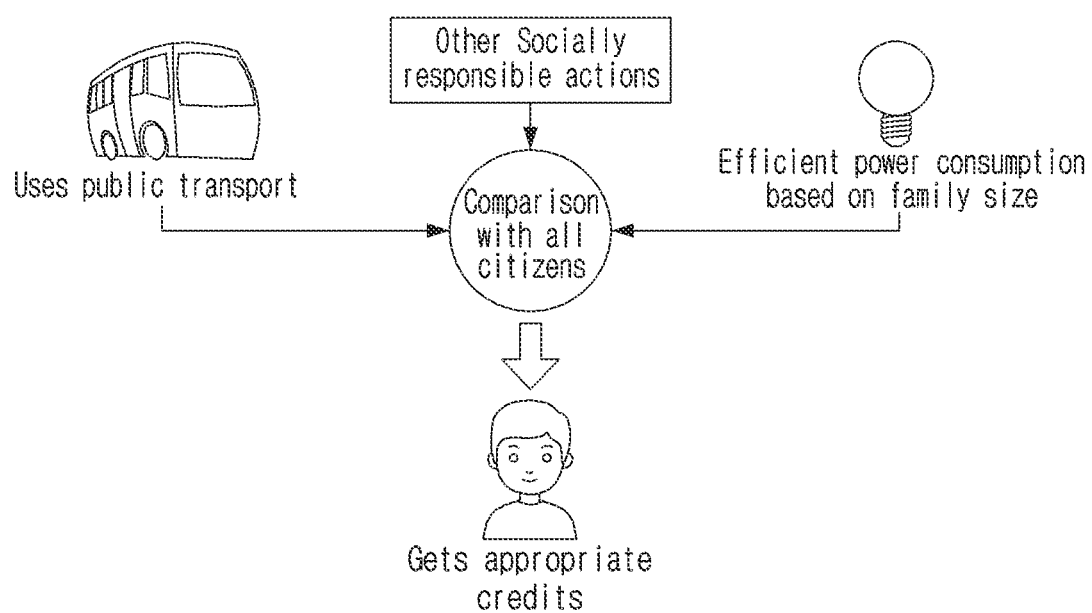
FIG. 7 is a diagram for illustrating a user apparatus that receives an incentive for use of a public transport service by using a block chain system according to an embodiment of the disclosure.

FIG. 7 is a diagram for illustrating a user apparatus according to an embodiment of the disclosure.

Referring to FIG. 7, a scenario is shown wherein a LIMO block chain framework facilitates incentivizing users on available public transport according to an embodiment of the disclosure.

The public transport service corporation and users may use a light-weight mobile block chain framework for performing transactions.

In case user apparatuses use services of the public transport service corporation, transactions may include crediting of tokens to the users and debiting of tokens from the public transport service corporation.

The public transport service corporation may be funded with currency from a public/private organization that intends to reduce pollution or traffic, and users credited with tokens from the public transport service corporation as a reward of using public transport services may retrieve currency by exchanging the tokens. Here, the tokens may act as an incentive for the users. The tokens may be exchanged for available benefits such as payment of bills, discounts of airline/railway tickets, acquisition of passes, use of prioritized services, etc.

For example, it is assumed that Bob intends to use a public transport service to reach a particular destination. Bob may book a ticket to reach the destination by using a smartphone which is the user apparatus 100 of the block chain system 1000. Here, the act of booking a ticket may be considered as a transaction. The terminal apparatus of the public transport service corporation may record Bob's act of purchasing a ticket, and provide tokens in a predefined number to Bob as an incentive. Then, Bob may exchange the tokens in return for benefits. This may encourage Bob to keep using public transport.

Figure 8:
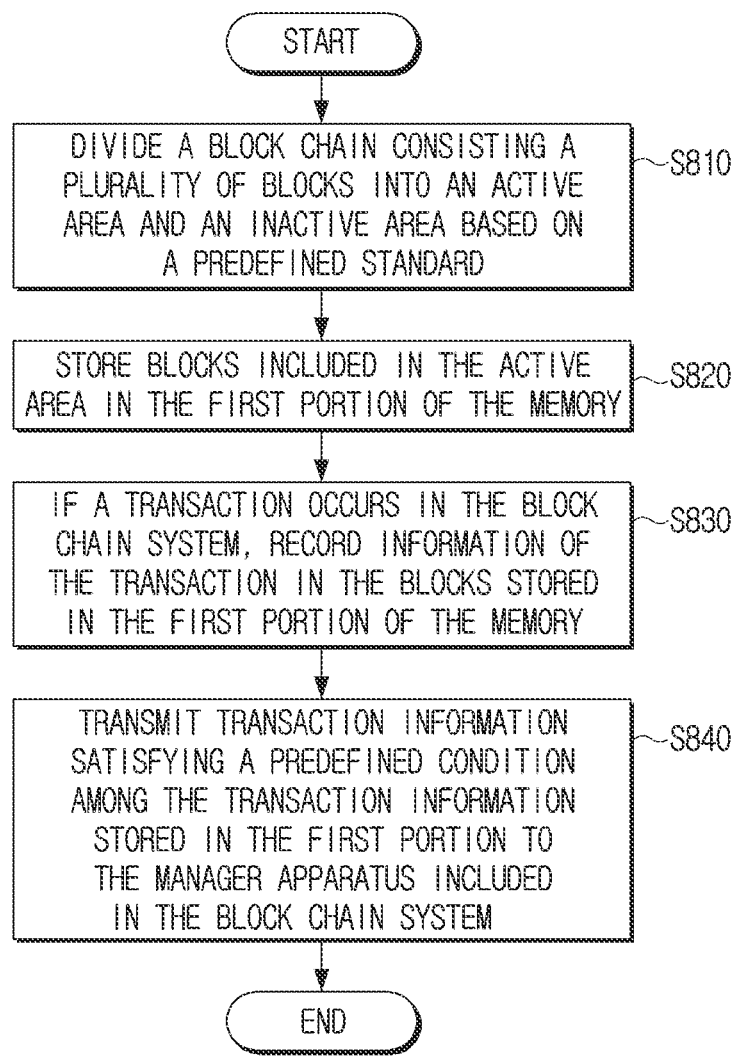
FIG. 8 is a flow chart for illustrating a method of controlling a user apparatus according to an embodiment of the disclosure.

FIG. 8 is a flow chart for illustrating a method of controlling a user apparatus according to an embodiment of the disclosure.

Referring to FIG. 8, a block chain consisting of a plurality of blocks may be divided into an active area and an inactive area based on a predefined standard at operation S810.

A standard used for dividing a block chain may be a time factor and/or a storage factor of a user apparatus, and this may be set by the block chain network manager and/or the manager apparatus.

Then, blocks included in the active area may be stored in the first area of the memory at operation S820.

Then, if the state database including summary information for the inactive area is received from the manager apparatus, the received state database may be stored in the second area of the memory. Here, the summary information may include identification information and token information for the plurality of user apparatuses included in the block chain system.

Also, at least one of the transaction information included in the inactive area may be stored in the third area of the memory according to a request of the manager apparatus.

Then, if a transaction occurs in the block chain system, information of the transaction may be recorded in the blocks stored in the first area of the memory at operation S830.

Here, validation for the transaction that occurred in the block chain system may be performed based on the state database stored in the second area, and information of the validated transaction may be recorded in the blocks stored in the first area. Specifically, if a transaction occurs, validation for the transaction that occurred in the block chain system may be performed based on information of the transaction included in the blocks stored in the first area and summary information stored in the second area.

Then, transaction information satisfying a predefined condition among the transaction information stored in the first area may be transmitted to the manager apparatus included in the block chain system at operation S840.

Here, based on the transaction information satisfying a predefined condition, the state database stored in the second area of the memory may be updated, and the updated state database may be uploaded to the block chain system.

History information of a transaction that occurred in the block chain system may be requested to the manager apparatus of the block chain system.

Then, transaction information corresponding to the requested history information among the inactive areas of the block chain that are distributed and stored among the plurality of user apparatuses in the block chain system may be received through the manager apparatus.

Also, the received transaction information may be validated by comparing hash data corresponding to the received transaction information and hash data included in the header of at least one block among the blocks stored in the first area.

The various operations described as being performed through at least one of the user apparatus 100 or the manager apparatus 200 in the above may be performed through one or more electronic apparatuses in a form of a controlling method of an electronic apparatus or a controlling method or an operating method of a system including an electronic apparatus.

The various embodiments described above may be implemented in a recording medium that can be read by a computer or an apparatus similar to a computer, by using software, hardware, or a combination thereof.

According to implementation by hardware, the embodiments described in the disclosure may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electronic unit for performing various functions.

In some cases, the embodiments described in the disclosure may be implemented as the processor itself. According to implementation by software, the embodiments such as procedures and functions described in the disclosure may be implemented as separate software modules. Each of the aforementioned software modules may perform one or more functions and operations described in the disclosure.

Computer instructions for performing processing operations at the user apparatus or the manager apparatus according to the aforementioned various embodiments of the disclosure may be stored in a non-transitory, computer-readable medium. Such computer instructions stored in a non-transitory, computer-readable medium may make the processing operations at the user apparatus or the manager apparatus according to the aforementioned various embodiments performed by the aforementioned specific machine, when they are executed by the processor of the specific machine.

A non-transitory, computer-readable medium refers to a medium that stores data semi-permanently, and is readable by machines, but not a medium that stores data for a short moment such as a register, a cache, and a memory. Specifically, the aforementioned various applications or programs may be provided while being stored in a non-transitory, computer-readable medium such as a compact Disc (CD), a digital versatile disc (DVD), a hard disk, a blue-ray disk, a universal serial bus (USB), a memory card, a ROM, and the like.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A user apparatus connectable to a block chain system, the user apparatus comprising:
a memory;
a communication interface; and
at least one processor configured to:
divide a block chain consisting of a plurality of blocks into an active area and an inactive area based on a predefined standard,
store blocks included in the active area in a first portion of the memory,
based on a state database comprising summary information for the inactive area being received form a manager apparatus included in the block chain system, store the state database in a second portion of the memory,
based on a transaction occurring in the block chain system, perform a validation for the transaction that occurred in the block chain system based on the state database in the second portion, and record information of the validated transaction in the blocks stored in the first portion of the memory, and
control the communication interface to transmit to the manager apparatus, transaction information satisfying a predefined condition among a plurality of transaction information stored in the first portion of the memory.

2. The user apparatus of claim 1,
wherein the summary information comprises identification information and token information for a plurality of user apparatuses included in the block chain system, and
wherein the at least one processor is further configured to:
in response to the transaction occurring, perform the validation for the transaction that occurred in the block chain system based on the information of the transaction included in the blocks stored in the first portion and the summary information stored in the second portion.

3. The user apparatus of claim 1, wherein the at least one processor is further configured to:
based on the transaction information satisfying the predefined condition, update the state database stored in the second portion of the memory, and
upload the updated state database to the block chain system.

4. The user apparatus of claim 1, wherein the at least one processor is further configured to:
based on a request of the manager apparatus, store at least one piece of transaction information included in the inactive area in a third portion of the memory.

5. The user apparatus of claim 1, wherein the at least one processor is further configured to:
control the communication interface to transmit, to the manager apparatus of the block chain system, a request for history information of a transaction that occurred in the block chain system, and
receive information corresponding to the requested history information in the inactive areas of the block chain that are stored while being distributed among a plurality of user apparatuses in the block chain system through the manager apparatus.

6. The user apparatus of claim 5, wherein the information of the transaction is validated by comparing hash data corresponding to the information of the transaction and hash data included in at least one block header among the blocks stored in the first portion.

7. The user apparatus of claim 6, wherein the at least one processor is further configured to:
validate the information of the transaction by comparing the hash data corresponding to the information of the transaction and hash data included in a header of at least one block among the blocks stored in the first portion.

8. The user apparatus of claim 7,
wherein the header of the at least one block comprises a first hash, a second hash, and optional metadata, and
wherein the first hash comprises an encrypted hash of a header of a previous block and the second hash comprises a Merkle root of hash data stored in the at least one block.

9. The user apparatus of claim 1, wherein the at least one processor is further configured to, based on a number of transactions increasing, move an oldest block of the active area of the block chain from the active area of the block chain to the inactive area of the block chain.

10. A method of controlling a user apparatus connectable to a block chain system, the method comprising:
dividing a block chain consisting of a plurality of blocks into an active area and an inactive area based on a predefined standard;
storing blocks included in the active area in a first portion of a memory of the user apparatus;
based on a state database comprising summary information for the inactive area being received from a manager apparatus included in the block chain system, storing the state database in a second portion of the memory;
based on a transaction occurring in the block chain system, performing a validation for the transaction that occurred in the block chain system based on the state database in the second portion, and recording information of the validated transaction in the blocks stored in the first portion of the memory; and
transmitting, to the manager apparatus, transaction information satisfying a predefined condition among a plurality of transaction information stored in the first portion of the memory.

11. The method of claim 10, further comprising:
in response to the transaction occurring, performing the validation for the transaction that occurred in the block chain system based on the information of the transaction included in the blocks stored in the first portion and the summary information stored in the second portion,
wherein the summary information comprises identification information and token information for a plurality of user apparatuses included in the block chain system.

12. The method of claim 10, further comprising:
based on the transaction information satisfying the predefined condition, updating the state database stored in the second portion of the memory; and
uploading the updated state database to the block chain system.

13. The method of claim 10, further comprising:
based on a request of the manager apparatus, storing at least one piece of transaction information included in the inactive area in a third portion of the memory.

14. The method of claim 10, further comprising:
transmitting, to the manager apparatus of the block chain system, a request for history information of at least one transaction that occurred in the block chain system; and
receiving transaction information corresponding to the requested history information in the inactive areas of the block chain that are stored while being distributed among a plurality of user apparatuses in the block chain system through the manager apparatus.

15. The method of claim 14, further comprising:
validating the information of the transaction by comparing hash data corresponding to the information of the transaction and hash data included in at least one block header among the blocks stored in the first portion.

16. The method of claim 15, further comprising:
validating the information of the transaction by comparing hash data corresponding to the information of the transaction and hash data included in a header of at least one block among the blocks stored in the first portion.

17. The method of claim 16,
wherein the header of the at least one block comprises a first hash, a second hash, and optional metadata, and
wherein the first hash comprises an encrypted hash of a header of a previous block and the second hash comprises a Merkle root of hash data stored in the at least one block.

18. The method of claim 14, further comprising:
based on a number of transactions increasing, moving an oldest block of the active area of the block chain from the active area of the block chain to the inactive area of the block chain.

* * * * *